United States Patent
Shimura

(10) Patent No.: US 7,317,423 B2
(45) Date of Patent: Jan. 8, 2008

(54) ANTENNA DEVICE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/590,559

(22) PCT Filed: Mar. 16, 2005

(86) PCT No.: PCT/JP2005/004624

§ 371 (c)(1),
(2), (4) Date: Aug. 24, 2006

(87) PCT Pub. No.: WO2005/087546

PCT Pub. Date: Sep. 22, 2005

(65) Prior Publication Data

US 2007/0188314 A1    Aug. 16, 2007

(30) Foreign Application Priority Data

Mar. 17, 2004  (JP) .............................. 2004-075782

(51) Int. Cl.
*H01Q 1/32* (2006.01)

(52) U.S. Cl. .................................... 343/711; 713/717

(58) Field of Classification Search ............... 343/711, 343/713, 717, 878
See application file for complete search history.

(56) References Cited

U.S. PATENT DOCUMENTS

| 6,304,172 | B1 | 10/2001 | Katou et al. |
| 6,362,733 | B1* | 3/2002 | Momose et al. ............ 340/447 |
| 6,774,777 | B2* | 8/2004 | Tsujita ........................ 340/445 |
| 6,931,923 | B2* | 8/2005 | Katou et al. ............... 73/146.5 |
| 6,997,048 | B2* | 2/2006 | Komatsu et al. ........... 73/146.2 |

FOREIGN PATENT DOCUMENTS

| JP | 2-18568 | 5/1990 |
| JP | 8-46414 | 2/1996 |
| JP | 10-126129 | 5/1998 |
| JP | 2000-158923 | 6/2000 |
| JP | 2002-190707 | 7/2002 |

* cited by examiner

*Primary Examiner*—Hoang V. Nguyen
(74) *Attorney, Agent, or Firm*—Greer, Burns & Crain, Ltd.

(57) ABSTRACT

An antenna device having an antenna to be mounted on the body side of a vehicle for receiving a radio signal from a tire condition detection device mounted on a tire side, or giving and receiving a radio signal between the tire condition detection device and a device mounted on the vehicle body side. The antenna device includes attachment means with which the antenna can be temporarily attached, moved and securely attached to the vehicle body side.

17 Claims, 4 Drawing Sheets

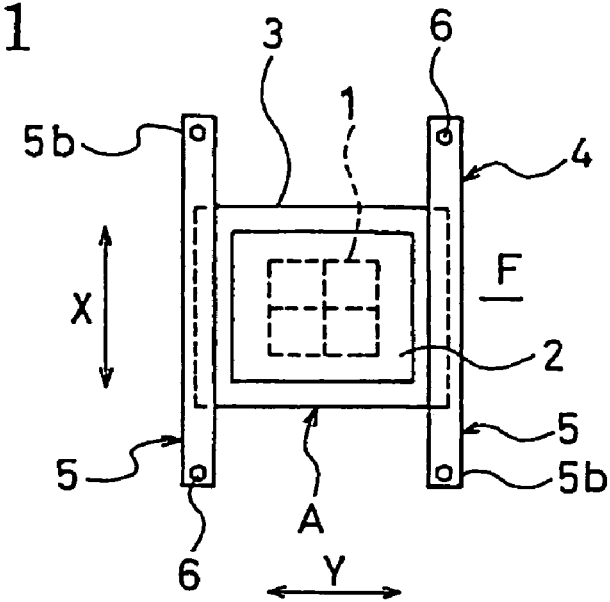
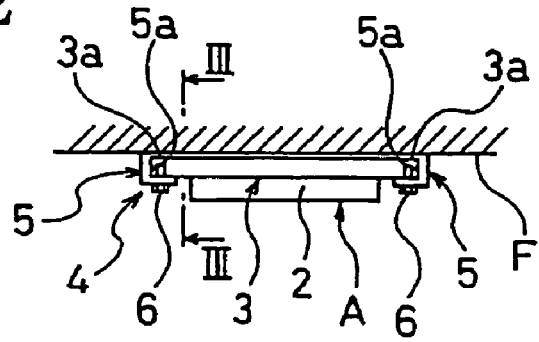
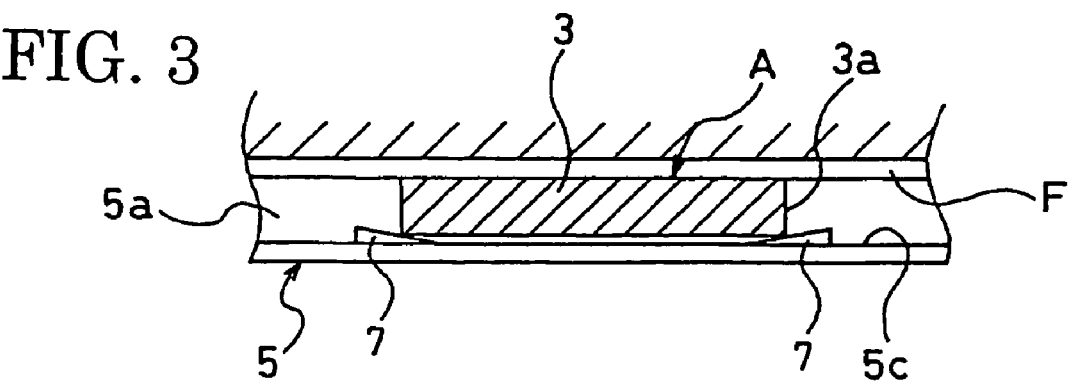

ANTENNA DEVICE

TECHNICAL FIELD

The present invention relates to an antenna device having an antenna mounted on the body side of a vehicle for, for example, receiving a radio signal from a tire condition detection device mounted on a tire side, and more particularly, to an antenna device capable of easily adjusting the reception efficiency of the antenna.

TECHNICAL BACKGROUND

Recently, in order to improve driving safety of a vehicle, there have been proposed systems that allow a driver to monitor an air pressure, temperature, etc. of a tire detected by a tire condition detection device mounted on a tire side (see patent documents 1, 2 and 3, for example), and the systems are coming into practical use.

In general, an antenna used for receiving a radio signal from the tire condition detection device is mounted on the inner surface of a fender where a tire is housed so as to be positioned as near as possible to the tire in order to gain good sensitivity. However, the strength of the radio wave allowed by Japanese legislation is very weak; it has found through actual vehicle running testing that the reception efficiency of the antenna receiving a radio signal from the tire condition detection device is greatly changed even if the attachment position of the antenna is slightly different.

At present, the above-mentioned antenna is mounted on the body side of a vehicle by threadedly securing the antenna contained in an antenna case to the inner surface of the fender having a plurality of tapped holes formed therein for attaching the antenna. To adjust the reception efficiency of the antenna, it is necessary to change the attachment position of the antenna; each time when the reception efficiency of the antenna is adjusted, it is required to form new tapped holes for attaching the antenna in the inner surface of the fender.

Normally, devices such as the antenna and the like are attached to the body of a vehicle, and the reception efficiency of the antenna is adjusted checking the conditions of the devices through actual vehicle running testing; when adjusted, new tapped holes for attaching the antenna are formed to change the attachment position of the antenna; this operation is troublesome, and a problem is that the adjustment of the reception efficiency of the antenna is not easy.

In particular in the case of vehicles such as trucks, dual wheels are used for their rear wheels, and when one antenna mounted on the body side of the vehicle receives a radio signal from each of tire condition detection devices placed within tires mounted on the dual wheels, the adjustment of the attachment position of the antenna is required.

Patent Document 1: Japanese Patent Application Kokai Publication No. 2002-225520
Patent Document 2: Japanese Patent Application Kokai Publication No. 2003-165465
Patent Document 3: Japanese Patent Application Kokai Publication No. 2003-165313

DISCLOSURE OF THE INVENTION

An object of the present invention is to provide an antenna device in which the reception efficiency of an antenna can be easily adjusted.

In order to achieve the above object, the present invention provides an antenna device having an antenna to be mounted on a vehicle body side for receiving a radio signal from a tire condition detection device mounted on a tire side, or giving and receiving a radio signal between the tire condition detection device and a device mounted on the vehicle body side, the antenna device having attachment means with which the antenna can be temporarily attached, moved and securely attached to the vehicle body side.

According to the present invention described above, since the antenna device includes attachment means that can temporarily attach, move and securely attach the antenna, the antenna can be attached to the vehicle body side in a temporarily attached state when the sensitivity of the antenna is checked in actual vehicle running testing; therefore, the attachment position of the antenna can easily be changed when the sensitivity of the antenna is adjusted. Accordingly, the reception efficiency of the antenna can be easily adjusted before secure attachment.

BRIEF DESCRIPTION OF THE DRAWINGS

FIG. 1 is a bottom view showing an embodiment of an antenna device according to the present invention in a state where it is mounted on the inner surface of a fender.

FIG. 2 is a side view of the antenna device of FIG. 1.

FIG. 3 is a partial enlarged view of the antenna device in a state where it is temporarily attached, taken along line III-III of FIG. 2.

BEST MODES FOR CARRYING OUT THE INVENTION

Figure 4:
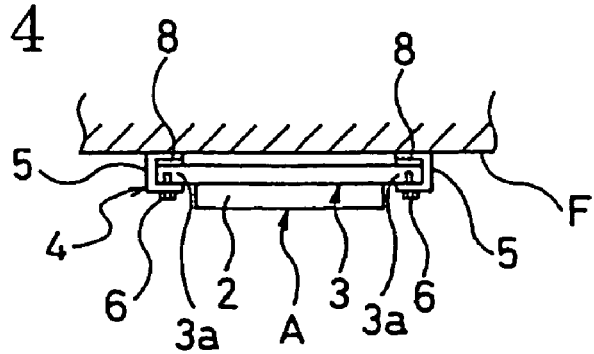
FIG. 4 is a side view showing another embodiment of an antenna device according to the present invention in a state where it is mounted on the inner surface of a fender.

Embodiments of the present invention will be described in detail below with reference to the attached drawings.

Referring to FIGS. 1 and 2, there is shown an embodiment of an antenna device according to the present invention, in which reference numeral 1 denotes an antenna to be mounted on the inner surface F of a fender for receiving a radio signal from a tire condition detection device mounted on a tire side, the antenna being substantially flatly formed. The antenna 1 is contained in an antenna case 2 in the form of a plane plate that is rectangular in shape.

A metal plate 3 for reflecting radio waves is mounted on the upper surface of the antenna case 2. The metal plate 3 is made in the form of a rectangle that is larger than the antenna case 2. A main body A of the antenna device comprises the antenna 1, antenna case 2 and metal plate 3, and the antenna device main body A is designed to be attached to the fender inner surface F by means of attachment means 4 that can temporarily attach, move and securely attach the main body.

The attachment means 4 includes a pair of guide rails 5 to be fixed to the fender inner surface F. The pair of guide rails 5 extend along the widthwise direction X of a vehicle body orthogonal to the anteroposterior direction Y of the vehicle body at a prescribed interval. The guide rails 5 each have an inner surface facing to each other, and the inner surface has a channel 5a extending from one end to the other end of the guide rail 5, the channel being in the form of a rectangle in cross section. The opposite ends 3a of the metal plate 3 slidingly engage the channels 5a, and the metal plate 3 is free to move along the guide rails 5. By moving the metal plate 3 along the guide rails 5, the antenna 1 contained in the antenna case 2 can be moved in the widthwise direction X of the vehicle body along the guide rails 5.

The guide rails 5 each have opposite ends 5b, and an escape prevention screw 6 for preventing the metal plate 3 in engagement with the channels 5a of the guide rails 5 from coming away therefrom is attached to the lower surface of each of the opposite ends 5b so as to project into the channel 5a. It is designed that when the antenna device main body A is assembled to the guide rails 5, one escape prevention screw 6 on one end side of each guide rail 5 is removed, and the opposite ends 3a of the metal plate 3 come into engagement with the channels 5a of the guide rails 5 from the one end side.

The attachment means 4 further includes wedges 7 as shown in FIG. 3. The antenna device main body A is temporarily attached to the guide rails 5 by placing the wedges 7 between the opposite ends 3a of the metal plate 3 and the lower wall surfaces 5c of the channels 5a of the guide rails 5. In actual vehicle running testing, the sensitivity of the antenna 1 is checked changing the temporary attachment position of the antenna device main body A temporarily attached by the wedges 7; by firmly fixing the metal plated 3 to the guide rails 5 in the channels 5a with bonding adhesive (not shown) at the position highest in reception efficiency, the antenna device main body A is attached to the vehicle body side by the attachment means 4; the antenna device main body A can be temporarily attached, moved and securely attached to the guide rails 5 mounted on the fender inner surface F.

According to the present invention described above, since the antenna device includes attachment means 4 that can temporarily attach, move and securely attach the antenna device main body A to the vehicle body side, the antenna device main body A can be attached to the vehicle body side in a temporarily attached state when the sensitivity of the antenna 1 is checked, whereby the attachment position of the antenna 1 can easily be changed in adjusting the sensitivity of the antenna 1. Accordingly, before secure attachment, the reception efficiency of the antenna 1 can be easily adjusted.

Referring to FIG. 4, there is shown another embodiment of an antenna device according to the present invention. In the embodiment of FIG. 4, the guide rails 5 described above are formed of metal that can be magnetically attracted, and the attachment means 4 further includes plate-shaped magnets 8 secured to the upper surface of each of the opposite ends 3a of the metal plate 3. The magnets 8 are used in the alternative of the wedges 7 to temporarily attach the antenna device main body A to the guide rails 5 mounted on the vehicle body side. The antenna device main body A is temporarily attached by making the metal plate 3 magnetically held by the guide rails 5 via the magnets 8, and after the attachment position is fixed, the metal plate 3 is firmly attached with bonding adhesive to the guide rails 5. As described above, the antenna device main body may be temporarily attached by means of the magnets 8 instead of the wedges 7.

Figure 5:
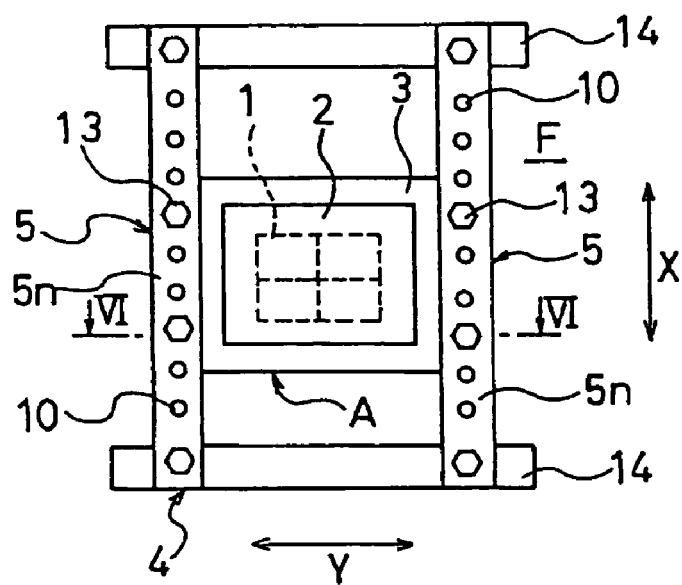
FIG. 5 is a bottom view showing still another embodiment of an antenna device according to the present invention in a state where it is mounted on the inner surface of a fender.
Figure 6:
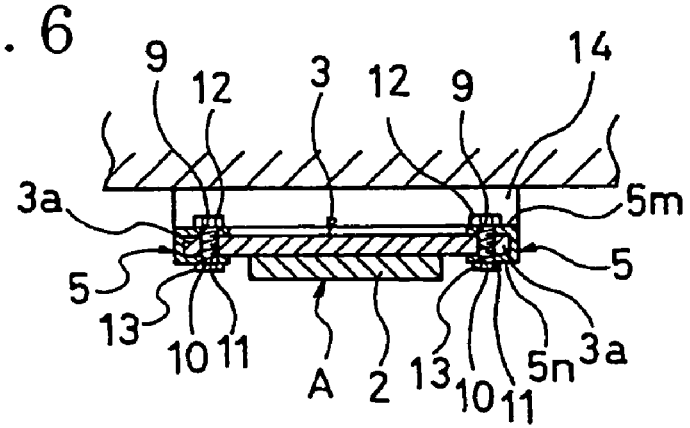
FIG. 6 is a cross-sectional view taken along line VI-VI of FIG. 5.

Referring to FIGS. 5 and 6, there is shown still another embodiment of an antenna device according to the present invention. In the embodiment of FIGS. 5 and 6, the upper channel wall portion 5m and lower channel wall portion 5n of each guide rail 5 have holes 9 and 10 formed therein at prescribed intervals in its longitudinal direction, respectively. The opposite ends 3a of the metal plate 3 have holes 11 formed therein at positions conforming to the holes 9 and 10. A nut 12 is fixed to the upper surface of the upper channel wall portion 5m at a location of each hole 9. The metal plate 3 can be temporarily and securely attached to the guide rails 5 by inserting bolts 13 through the holes 10, 11, 9 to engage the bolts with the nuts 12. The guide rails 5 are fixed to the fender inner surface F via a pair of right and left support members 14 extending in the anteroposterior direction Y of the vehicle body. The antenna device structured as described above can achieve the same effect as the above.

Figure 7:
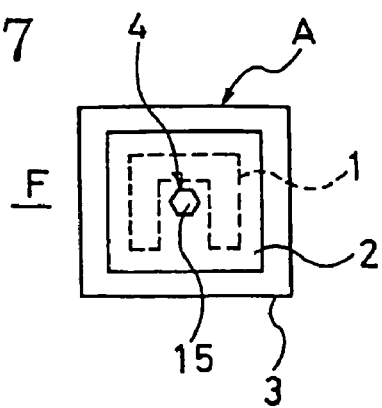
FIG. 7 is a bottom view showing still another embodiment of an antenna device according to the present invention in a state where it is mounted on the inner surface of a fender.
Figure 8:
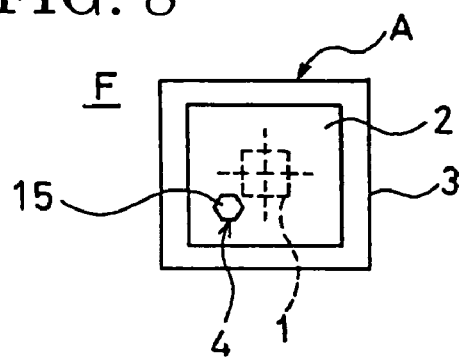
FIG. 8 is a bottom view showing still another embodiment of an antenna device according to the present invention in a state where it is mounted on the inner surface of a fender.

Referring to FIGS. 7 and 8, there are shown still other embodiments of an antenna device according to the present invention. In each of the embodiment of FIGS. 7 and 8, the attachment means 4 has a bolt (support member) 15 for rotatably and fixably supporting the antenna device main body A, and has no guide rails 5. By inserting the bolt 15 through a through hole (not shown) in each of the antenna case 2 and the metal plate 3 to threadingly engage it with a threadingly engaged portion (not shown) formed in the fender inner surface F and by fastening the bolts 15 to fix the antenna device main body A to the fender inner surface F, the antenna device main body A can be temporarily and securely attached to the fender inner surface F. The bolt 15 is fitted idly with the antenna case 2 and metal plate 3, which are rotatably supported in a state before temporary attachment or secure attachment by the bolt 15 threadingly engaged with the threadingly engaged portion. The direction of the antenna 1 can be changed by rotating the antenna device main body A around the bolt 15.

In the antenna device shown in FIG. 7, the bolt 15 is placed at the center of the antenna device main body A; this is employed when the antenna 1 has directional characteristics. In the antenna device shown in FIG. 8, the bolt 15 is placed at a location away from the center of the antenna device main body A; this can be employed both when the antenna 1 has directional characteristics and when the antenna 1 has no directional characteristics. As described above, by arranging such that the antenna device main body A is rotatably and fixably supported, also, the reception efficiency of the antenna 1 can be easily adjusted before securely attaching.

In each of the antenna devices of FIGS. 7 and 8, when the fender inner surface F is formed of metal, the attachment means 4 may further include the magnets 8 described above. The antenna device main body A is temporarily attached to the fender inner surface F by the magnets 8, and the bolt 15 is used to securely attach the antenna device main body A to the fender inner surface F.

Figure 9:
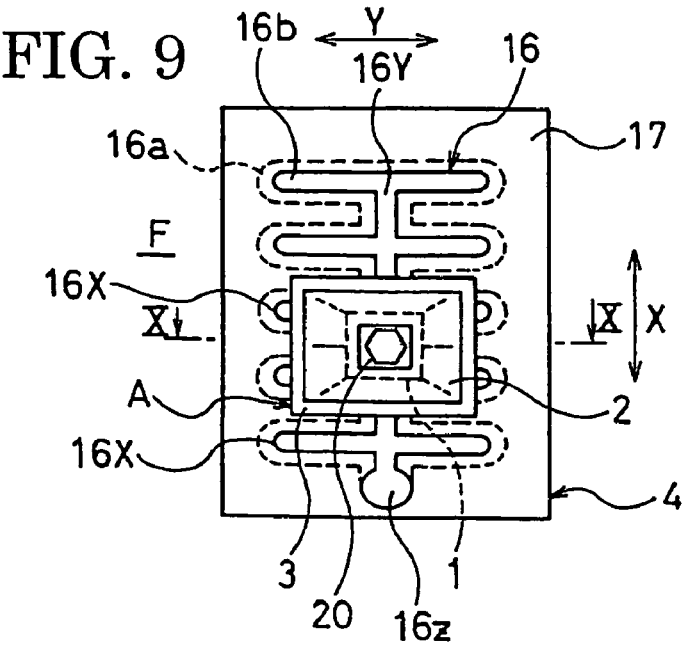
FIG. 9 is a bottom view showing still another embodiment of an antenna device according to the present invention in a state where it is mounted on the inner surface of a fender.
Figure 10:
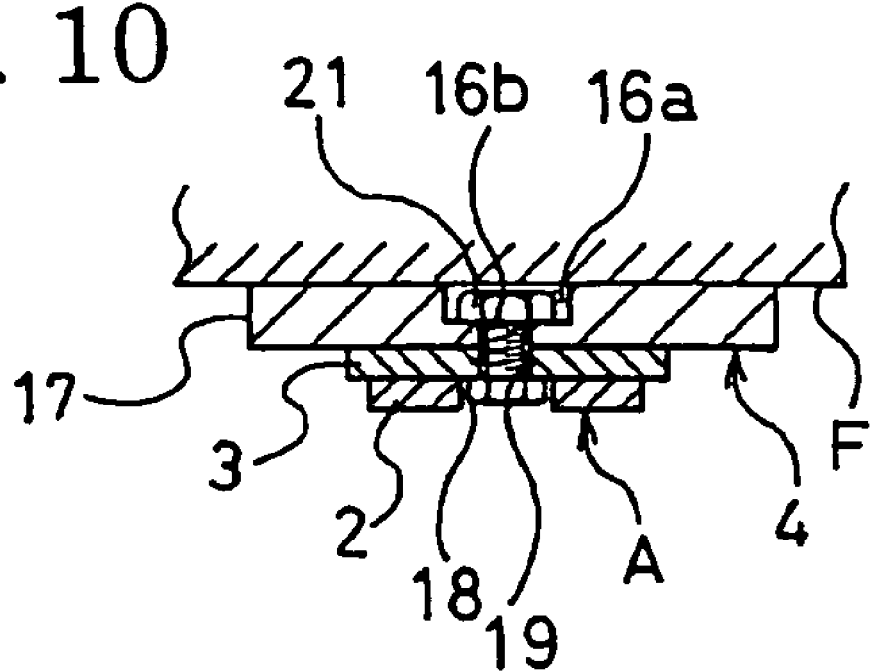
FIG. 10 is a cross-sectional view taken along line X-X of FIG. 9.

Referring to FIGS. 9 and 10, there is shown still another embodiment of an antenna device according to the present invention. In the embodiment of FIGS. 9 and 10, the attachment means 4 includes a flat-plate-shaped base (guide member) 17 having a guide channel 16 extending in the anteroposterior direction Y of the vehicle body and in the vehicle widthwise direction X orthogonal thereto. The base 17 is designed to be mounted on the fender inner surface F.

The guide channel 16 is formed through the base from its upper surface to its lower surface, and has an upper channel portion 16a and a lower channel portion 16b, the upper channel portion 16a being greater in width than the lower channel portion 16b to have a two-step structure. The width of the upper channel portion 16a is one that allows a hexagon nut 21 described later to move in the channel portion 16a and that prevents the rotation of the hexagon nut; the width of the upper channel portion 16a enables the hexagon nut 21 to move only along the guide channel 16.

The attachment means 4 further includes a bolt 20. The antenna case 2 and the metal plate 3 have through holes 18 and 19 for inserting the bolt 20 therethrough, respectively, formed therein at the center of each of the antenna case and metal plate. The guide channel 16 has a wide channel portion 16z for placing the hexagon nut 21 in the upper channel portion 16a.

The antenna device main body A is attached to the base 17 by the bolt 20. This attachment is as follows. First, the bolt 20 is inserted through the through holes 18 and 19 of the antenna case 2 and metal plate 3 to threadingly engage the tip portion of the bolt with the hexagon nut 21. Next, the hexagon nut 21 in engagement with the bolt 20 is inserted into the guide channel 16 from the wide channel portion 16z to be engaged with the upper channel portion 16a. Thus the antenna device main body A mounted on the base 17 via the bolt 20 can be moved in the anteroposterior direction Y of the vehicle body and in the vehicle widthwise direction X along the guide channel 16, and is rotatably supported with respect to the base 17. By fastening the bolt 20 to fix the antenna device main body A to the base 17, the antenna device main body A is temporarily attached or securely attached to the base 17.

In the embodiment shown in FIGS. 9 and 10, the guide channel 16 has a plurality of first channel portions 16X and a second channel portion 16Y, the first channel portions 16X extending in the anteroposterior direction Y of the vehicle body and being placed at prescribed intervals in the widthwise direction X of the vehicle body, the second channel portion 16Y extending along the widthwise direction X of the vehicle body passing through the center of each of the first channel portions 16X; the antenna device main body A can be moved in the anteroposterior direction Y of the vehicle body and in the widthwise direction X of the vehicle body via the first channel portions 16X and second channel portion 16Y. However, in the alternative of the guide channel 16 comprising the channel portions 16X and 16Y, the antenna device main body A may be movable in the anteroposterior direction Y of the vehicle body and in the widthwise direction X of the vehicle body via a guide channel extending in the form of a comb, a guide channel extending in the form of "L", etc.

By arranging such that the antenna device main body A can be moved in the anteroposterior direction Y of the vehicle body and in the widthwise direction X of the vehicle body as described above, the reception efficiency of the antenna 1 can be easily adjusted in a wider range. The antenna device main body A is rotatably supported by the bolt 20; therefore, if the antenna 1 has directional characteristics, the reception efficiency of the antenna 1 can be easily adjusted in an even wider range by changing the direction of the antenna 1.

In the antenna device of FIGS. 9 and 10, also, the attachment means 4 may further include a magnet. In this case, the magnet is attached to the hexagon nut 21, and the base 17 is formed of metal that can be magnetically attracted; the antenna device main body A is temporarily attached to the base 17 by making the hexagon nut 21 magnetically held by the base 17 via the magnet, and is securely attached to the base 17 by fastening the bolt 20 to fix the antenna device main body A to the base 17.

In each of the embodiments shown in FIGS. 1 to 6, the antenna device main body A is movable only in the widthwise direction X of the vehicle body along the guide rails 5; however, in the present invention, it may be arranged such that a pair of second guide rails extending in the anteroposterior direction Y of the vehicle body are further provided on the fender inner surface F, and the guide rails 5 are movably attached along the second guide rails, whereby each of the antenna device main bodies A shown in FIGS. 1 to 6 can be moved in the anteroposterior direction Y of the vehicle body and in the widthwise direction X of the vehicle body.

The antenna device main body A is not limited to the structure described above, but it suffices for the antenna device main body A to have at least the antenna 1. The antenna 1 is not limited to a flatly formed antenna described above, but may be one having any shape if it can receive a radio signal from a tire condition detection device and can be housed in the fender to which it is attached.

In the above embodiments, the antenna 1 has been described which is attached to the vehicle body side for receiving a radio signal from a tire condition detection device mounted on a tire side; however, the antenna may be one that is mounted on a vehicle body side to give and receive a radio signal between the tire condition detection device and a device mounted on the vehicle body side.

The antenna device of the present invention is preferably employed when one antenna mounted on a vehicle body side receives radio signals from tire condition detection devices mounted on tires mounted on rear wheels, comprising dual wheels, of a vehicle such as a truck in particular, or gives and receives radio signals between the tire condition detection devices and a vehicle side device; however, as is obvious, the present invention is not limited thereto.

INDUSTRIAL APPLICABILITY

The antenna device of the present invention having the aforementioned excellent effect can be very effectively utilized when an antenna that receives a radio signal from a tire condition detection device mounted on a tire side, or gives and receives a radio signal between the tire condition detection device and a device mounted on a vehicle side, is mounted on a vehicle body for use.

What is claimed is:

1. An antenna device having an antenna to be mounted on a vehicle body side for receiving a radio signal from a tire condition detection device mounted on a tire side, or giving and receiving a radio signal between the tire condition detection device and a device mounted on the vehicle body side, the antenna device having attachment means with which the antenna can be temporarily attached, moved and securely attached to the vehicle body side.

2. An antenna device according to claim 1, wherein the attachment means has a guide rail to be mounted on the vehicle body side, the antenna being engaged with the guide rail, and wherein the antenna can be temporarily attached, moved and securely attached to the guide rail.

3. An antenna device according to claim 1, wherein the attachment means has a guide member to be mounted on the vehicle body side, the guide member having a guide channel with which the antenna is engaged, and wherein the antenna can be moved along the guide channel and can be temporarily attached and securely attached to the guide member.

4. An antenna device according to claim 3, wherein the antenna is rotatably engaged with the guide channel.

5. An antenna device according to claim 1, wherein the attachment means is arranged such that the antenna can be moved in an anteroposterior direction of the vehicle body and in a widthwise direction of the vehicle body.

6. An antenna device according to claim 1, wherein the attachment means has a support member for rotatably and fixably supporting the antenna to the vehicle body side.

7. An antenna device according to claim 6, wherein the support member rotatably and fixably supports the antenna at a position away from a center of the antenna.

8. An antenna device according to claim 1, wherein the attachment means has a magnet for temporarily attaching the antenna.

9. An antenna device according to claim 1, comprising an antenna case in which the antenna is contained, and a metal plate for reflecting a radio wave, the antenna case having an upper surface, the metal plate being mounted on the upper surface of the antenna case, the attachment means having a pair of guide rails to be mounted on the vehicle body side, the metal plate being slidingly engaged with the pair of guide rails.

10. An antenna device according to claim 9, wherein the attachment means has wedges for temporarily attaching the metal plate to the pair of guide rails.

11. An antenna device according to of claim 9, wherein the pair of guide rails are formed of metal that can be magnetically attracted, the attachment means having magnets that can magnetically attract the guide rails, the magnets being attached to the metal plate, the attachment means being designed so that the metal plate is temporarily attached to the guide rails by magnetically attaching the magnets to the guide rails.

12. An antenna device according to of claim 9, wherein the attachment means has a plurality of bolts for temporarily and securely attaching the metal plate to the pair of guide rails, the pair of guide rails having holes for inserting the bolts therethrough at prescribed intervals in a longitudinal direction thereof.

13. An antenna device according to claim 1, comprising an antenna case in which the antenna is contained, and a metal plate for reflecting a radio wave, the antenna case having an upper surface, the metal plate being mounted on the upper surface of the antenna case, the attachment means having a guide member to be mounted on the vehicle body side, and a bolt with which the antenna case and the metal plate can be fixed to the guide member, the guide member having a guide channel, the bolt being engaged with the guide channel, the attachment means being designed so that the antenna is moved by moving the bolt along the guide channel and is temporarily attached or securely attached by fixing the antenna case and the metal plate to the guide member with the bolt.

14. An antenna device according to claim 13, wherein the bolt is inserted through the antenna case and the metal plate, the bolt rotatably supporting the antenna case and the metal plate in a state before temporary attachment or secure attachment.

15. An antenna device according to claim 13, wherein the attachment means has a nut that is engaged with the guide channel and can be only moved along the guide channel, the bolt being threadingly engaged with the nut.

16. An antenna device according to claim 1, comprising an antenna case in which the antenna is contained, and a metal plate for reflecting a radio wave, the antenna case having an upper surface, the metal plate being mounted on the upper surface of the antenna case, the attachment means having a threadingly engagable bolt with the vehicle body side for rotatably and fixably supporting the antenna case and the metal plate to the vehicle body side, the attachment means being designed so that a direction of the antenna is changed by rotating the antenna case and the metal plate, and the antenna is temporarily or securely attached by fixing the antenna case and the metal plate to the vehicle body side with the bolt.

17. An antenna device according to claim 16, wherein the bolt rotatably and fixably supports the antenna case and the metal plate at a position away from a center of the antenna.

* * * * *